United States Patent [19]

Morii et al.

[11] Patent Number: 5,036,394
[45] Date of Patent: Jul. 30, 1991

[54] VIDEOTEXT RECEIVER

[75] Inventors: Takashi Morii; Youichi Ishibashi, both of Ibaraki, Japan

[73] Assignee: Matsushita Electric Industrial Co., Ltd., Osaka, Japan

[21] Appl. No.: 445,771

[22] Filed: Dec. 4, 1989

[30] Foreign Application Priority Data

Dec. 2, 1988 [JP] Japan .................. 63-306466

[51] Int. Cl.⁵ .............................................. H04N 7/08
[52] U.S. Cl. ..................................... 358/146; 358/147
[58] Field of Search .................... 358/142, 146, 147

[56] References Cited

U.S. PATENT DOCUMENTS

| | | | |
|---|---|---|---|
| 4,554,660 | 11/1985 | Noirel et al. | 358/142 |
| 4,701,794 | 10/1987 | Fröling et al. | 358/146 |
| 4,739,402 | 4/1988 | Maeda et al. | 358/147 |
| 4,908,706 | 3/1990 | Bugg | 358/147 |

FOREIGN PATENT DOCUMENTS

| | | | |
|---|---|---|---|
| 0055168 | 6/1982 | European Pat. Off. | 358/147 |
| 53-112024 | 9/1978 | Japan . | |
| 53-116025 | 10/1978 | Japan . | |
| 54-36122 | 3/1979 | Japan . | |
| 0062491 | 5/1981 | Japan | 358/147 |
| 0201391 | 12/1982 | Japan | 358/142 |
| 0194482 | 11/1983 | Japan | 358/142 |

Primary Examiner—Victor R. Kostak
Attorney, Agent, or Firm—Wenderoth, Lind & Ponack

[57] ABSTRACT

A videotext receiver receives textual and graphic data including control data, header data and main text data. The videotext receiver includes a RAM for storing the textual and graphic data of a plurality of programs in a received broadcast signal, a microprocessor having a header selector for selecting the header data in the textual and graphic data stored in RAM, and a memory for storing a plurality of the selected header data. The selected header data is displayed on a CRT in a list format.

5 Claims, 5 Drawing Sheets

VIDEOTEXT RECEIVER

BACKGROUND OF THE INVENTION

1. Field of the Invention

The present invention relates to a videotext receiver which receives and decodes the textual and graphic data multiplexed for transmission with a normal television broadcast for display on a CRT or other display device.

2. Description of the Prior Art

Various multiplex television broadcasting formats have been considered in recent years to more efficiently utilize existing broadcasting bands. One of these is videotext, already a commercialized broadcasting service whereby news and weather reports, stock market information, and other information comprised of text and/or graphics can be received and displayed on a home television receiver.

A typical videotext broadcast receiver currently used in the above system to receive the textual and graphic data multiplexed with the television broadcast signal and to display this information on a home television receiver is described below with reference to FIG. 6.

FIG. 6 shows the construction of a conventional videotext receiver wherein element 1 is the text and graphic data decoder 1 which restores the textual and graphic data to a text and graphic image; element 2 is a microprocessor for controlling the textual and graphic data decoder 1; element 3 is a receiver circuit for extracting the textual and graphic data from the video signal as digital data; element 4 is a RAM that stores the received textual and graphic data and is used as the operating area of the microprocessor 2; element 5 is an ROM in which is written the program controlling the operation of the microprocessor 2; element 7 is a video display memory in which is stored the text and graphic image decoded by the microprocessor 2; element 6 is a display processor that synthesizes the text and graphic image stored in the video display memory 7 into an RGB signal; element 9 is a character generator used when the textual and graphic data is decoded into a text and graphic image; element 8 is an added sound decoder used to process the additional sound data included in the textual and graphic data; and element 10 is a keypad used to select the desired text and graphic data for display.

Reference number 20 is a television signal receiver, which is comprised of an antenna 21, a television signal receiver circuit 22, an audio demodulation amplifier 23, a brightness amplifier and color demodulator circuit 24, a video/voice selector 25 which selects or mixes the video sound signal or the RGB signal and added sound signal output from the textual and graphic data decoder 1, an audio amplifier output circuit 26, a video amplifier output circuit 27, a speaker 28, and a display 29 for displaying the video image.

The operation of a conventional videotext receiver constructed as described above is described below.

The television signal input from the antenna 21 is demodulated by the television signal receiver circuit 22 in the television signal receiver 20, and video and audio signals are thereby extracted. The video signal is input to the receiver circuit 3 of the textual and graphic data decoder 1, and the text and graphic data is extracted from the video signal. When the user operates the keypad 10 to select the desired text and graphic data program from the many text and graphic data programs received, a request is sent from the keypad 10 to the microprocessor 2. The microprocessor 2 accordingly selects the requested text and graphic data program, and converts the text and graphic data to a text and graphic image according to the program written in the ROM 5 and using the character generator 9 as may be required. The resulting text and graphic image is then stored in the video display memory 7. The text and graphic image in the video display memory 7 is synthesized as an RGB signal by the display processor 6, and any additional sound data contained in the text and graphic data is converted to the added sound signal by the added sound decoder 8.

At the same time, the audio and video signals demodulated by the television signal receiver circuit 22 are respectively input to the audio demodulation amplifier 23 and the brightness amplifier and color demodulator circuit 24 where they are processed and then output to the video/voice selector 25. The video/voice selector 25 switches and selects the video signal (RGB signal) and audio signal (the added sound signal) output from the text and graphic data decoder 1 when the user selects a videotext program, or selects the television video and audio signals when the user selects a regular television broadcast, and outputs the selected signals to the speaker 28 and display 29 via the audio amplifier output circuit 26 and video amplifier output circuit 27, respectively. The user is thus able to view the selected television program or videotext program on the display 29.

During videotext program reception, there is a delay from the time the user selects the desired program to the time that program is received and displayed on the screen. To eliminate this delay, conventional videotext receivers store the videotext program in memory.

In the videotext receiver shown in FIG. 6, the program number of the text and graphic data to be stored in the RAM 4 and the channel number of the television broadcast are selected by the user by operating the keypad 10. The microprocessor 2 then stores the selected videotext program in the RAM 4.

At this time the user may also use the keypad 10 to enter a memo so that the contents of the selected program can be easily identified later.

The microprocessor 2 stores the selected program number of the text and graphic data, channel number, and memos in the RAM 4. As controlled by the user with the keypad 10, the microprocessor 2 may also display on the screen a list of the text and graphic data program numbers, channel numbers, and memos stored in the RAM 4.

The user is then able to refer to this list of program numbers, channel numbers, and memos to quickly view any selected program with no delay in the display time.

However, in a videotext receiver of this type, the user must first work the keypad 10 to enter the program numbers, channel numbers, and memos for all desired programs in order to display on screen a list of the videotext program numbers, channel numbers, and memos stored in memory, and this data entry operation is both complicated and inconvenient.

SUMMARY OF THE INVENTION

The present invention has been developed with a view to substantially solving the above described disadvantage and has for its essential object to provide an improved videotext receiver which can automatically compile a list of videotext programs stored in memory without requiring any complicated operation on the part of the user.

In order to achieve the aforementioned object, the videotext receiver according to the present invention is comprised of a memory device in which textual and graphic data from the received videotext program is accumulated, and a microprocessor comprised of a header select means; this header select means selects and displays only the header data contained in the textual and graphic data stored in said memory.

The construction of the present invention as described above makes it possible to select and display only that data in the header of the videotext data stored in the memory. The header data normally contains text identifying the broadcasting station, program number, and type of data. By compiling this header data into a single table for display, the user is able to compile and display a list of the videotext programs stored in memory without performing any complicated operation.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
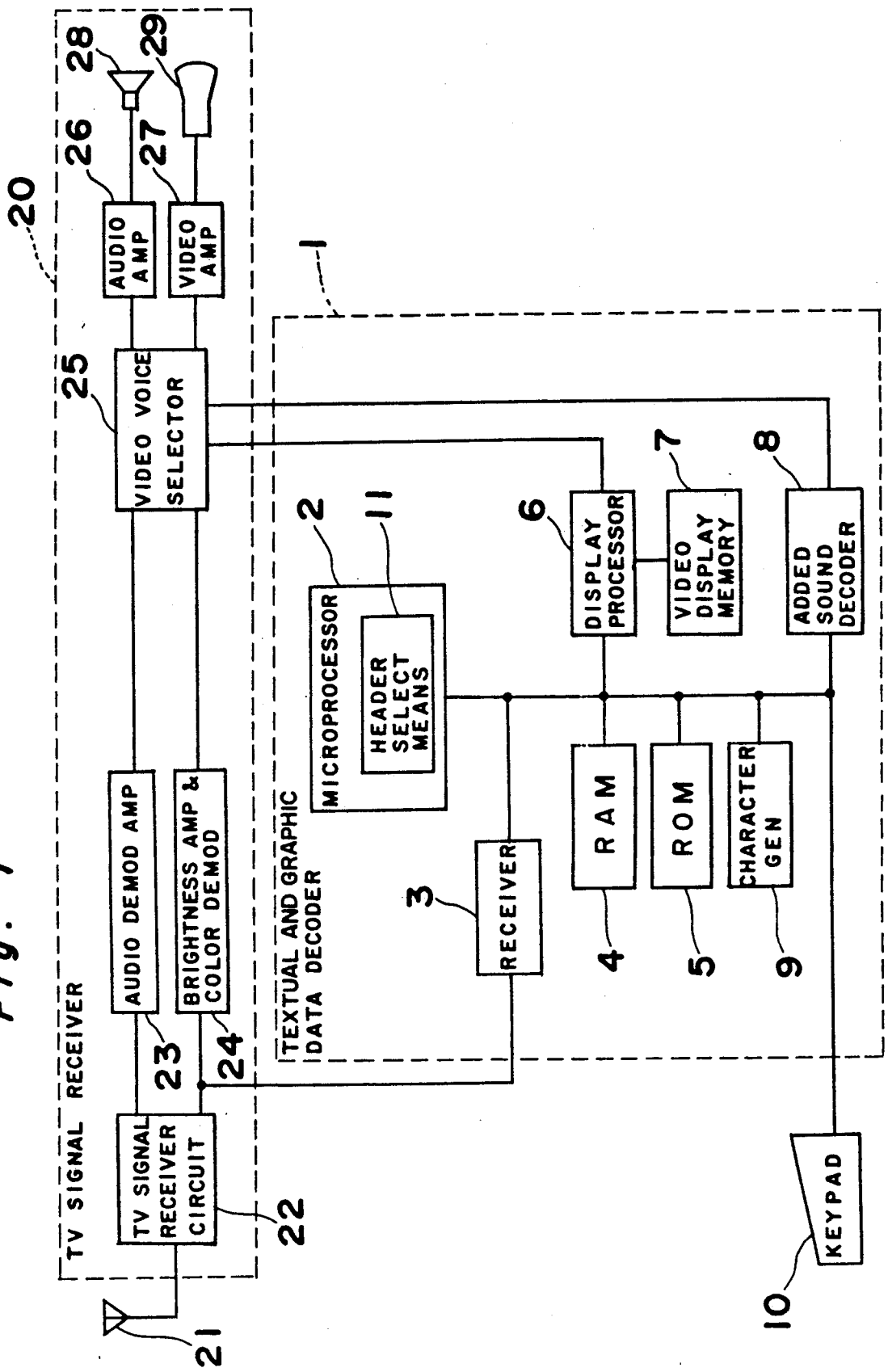
FIG. 1 is a block diagram of the videotext receiver according to a preferred embodiment of the present invention.

Referring to FIG. 1, a videotext receiver according to one preferred embodiment of the present invention is shown. As shown in FIG. 1, the videotext receiver is comprised of a textual and graphic data decoder 1 and a television signal receiver 20.

The textual and graphic data decoder 1 includes receiver circuit 3, RAM 4, ROM 5, display processor 6, video display memory 7, added sound decoder 8 and keypad 10.

The television signal receiver 20 includes antenna 21, television signal receiver circuit 22, audio demodulation amplifier 23 brightness amplifier and color demodulator circuit 24, video/voice selector 25, audio amplifier output circuit 26, video amplifier output circuit 27, speaker 28, and display 29.

Figure 6:
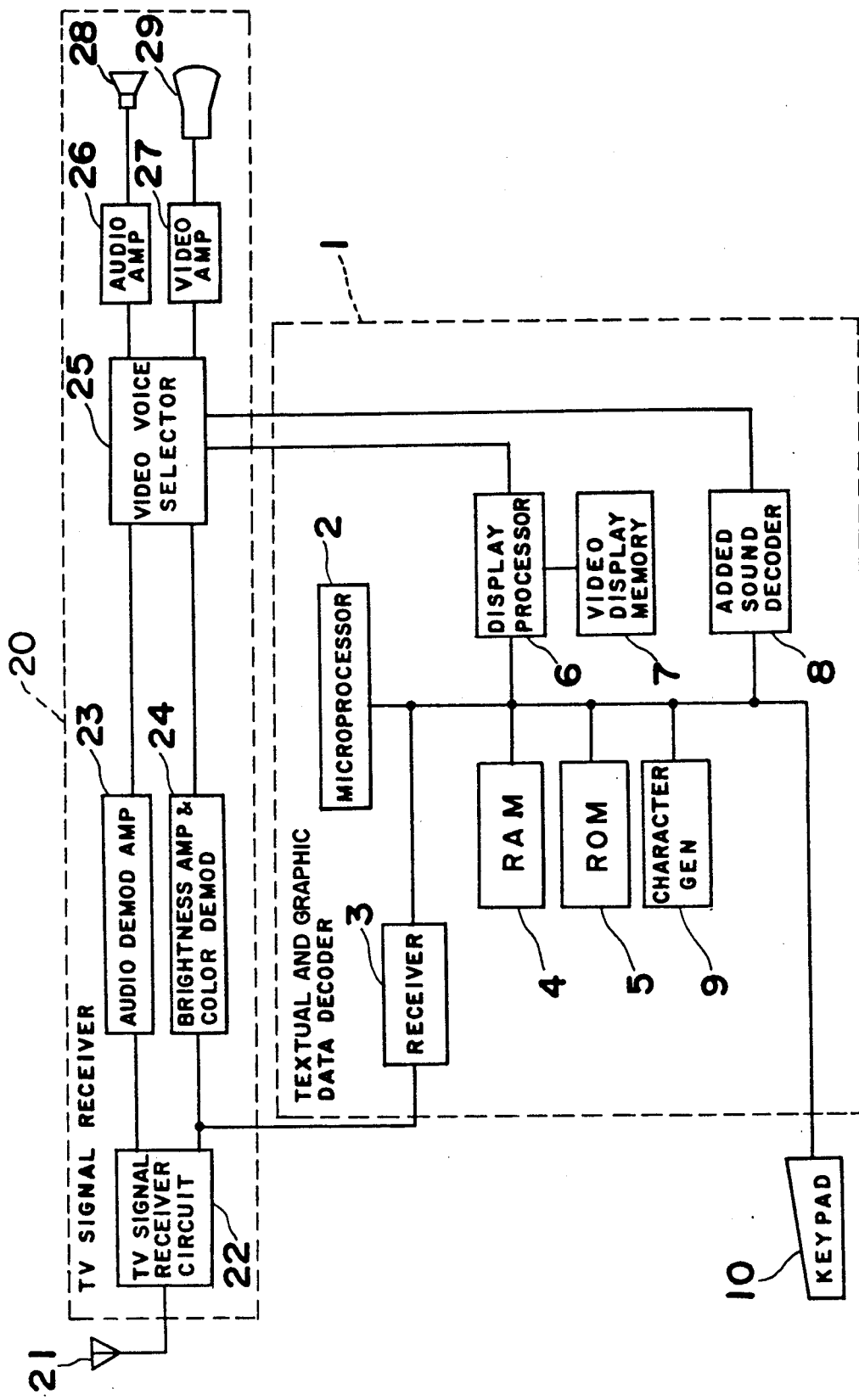
FIG. 6 is a block diagram of a conventional videotext receiver.

Each of the above described components is the same as that of the corresponding number in FIG. 6 described above. According to the present invention, a microprocessor 2 provided in the textual and graphic data decoder 1 is comprised of a header select means 11 which selects and compiles a table of only the header data contained in the textual and graphic data stored in the RAM 4.

The operation of a videotext receiver thus comprised is described below.

The videotext receiver according to the preferred embodiment of the present invention operates the same as the conventional videotext receiver shown in FIG. 6 for the parts with the same reference numbers. As instructed by the operator using the keypad 10, the header select means 11 in the microprocessor 2 extracts only the header data from the textual and graphic data stored in the RAM 4, converts this header data to a graphic data of the compiled table, and stores this graphic data in the video display memory 7. The image of the header data table stored in the video display memory 7 is synthesized into an RGB signal by the display processor 6, and input to the display 29 by the video/voice selector 25 and video amplifier output circuit 27. The header data table compiled from the text and graphic data stored in RAM 4 is thus displayed on the display 29.

Figure 2:
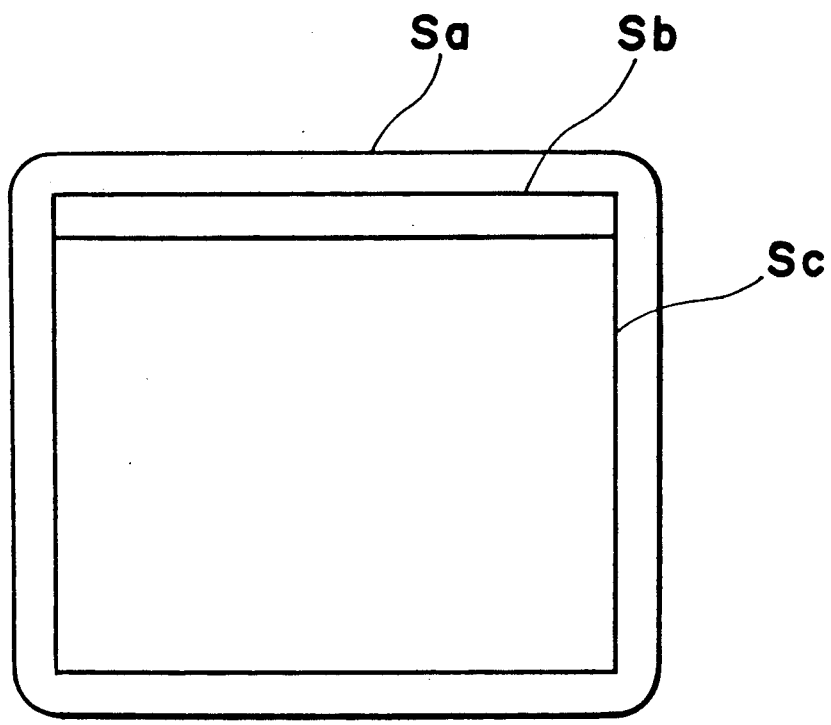
FIG. 2 is a plan view of the television screen showing the display area of text and graphic data in a videotext broadcast.

Referring to FIG. 2, a television screen is shown for indicating the display area of the textual and graphic data in a videotext broadcast. In FIG. 2, Sa represents the total display area of the display 29, Sb is the header data display area, and Sc is the main text display area. The broadcasting station name, program number, and type of information are displayed in the header data display area Sb, and the main text and graphics in the selected program are displayed in the main text display area Sc.

Figure 3:
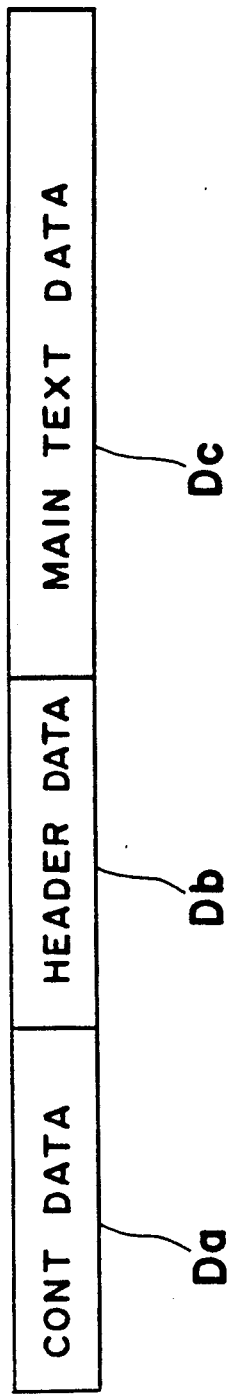
FIG. 3 is a diagrammatic view of the data composition used with text and graphic data in a videotext broadcast.

Referring to FIG. 3, the data structure of the text and graphic data in a videotext broadcast is shown. In FIG. 3, Da is the control data, Db is the header data, and Dc is the main text data. The control data Da contains data relating to the program number and is not displayed. The header data Db is displayed in the header data display area Sb in FIG. 2, and the main text data Dc is displayed in the main text display area Sc in FIG. 2.

Figure 4:
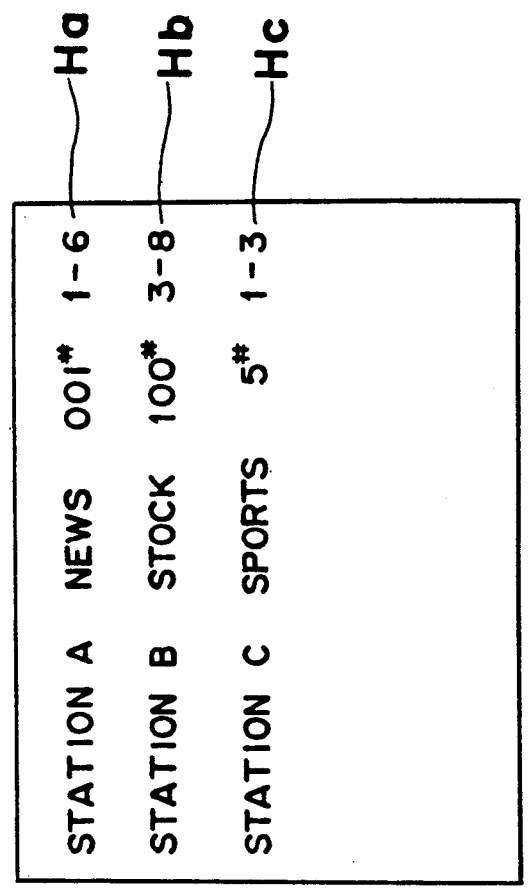
FIG. 4 is a plan view of the television screen showing an example of the header data table display.

Referring to FIG. 4, an example of the header data table compiled by the present invention is shown. In FIG. 4, Ha, Hb and Hc are specific header data lines.

According to the preferred embodiment as described above, by providing a RAM 4 which stores the textual and graphic data in the received videotext program and a microprocessor 2 comprised of a header select means 11 which extracts and compiles table of the header data contained in the text and graphic data stored in the RAM 4, a table of the videotext programs stored in RAM 4 can be compiled without requiring the operator to execute a complicated operation.

It is to be noted that specifically desired text and graphic data can be stored in the RAM 4 not only with a keypad operation as was possible with a conventional videotext receiver, but also with "one-touch reservations". This "one-touch reservation" function enables the operator to press a specific reservation key on the keypad 10 to store the currently displayed textual and graphic image in the RAM 4. When this key is pressed, the microprocessor 2 identifies the current signal and stores the data for the displayed text and graphic image in the RAM 4.

Because a code identifying the type of data installed in each of sections Da, Db and Dc is inserted at very beginning of each section, the header data Db can be extracted by the header select means 11 by simply finding the code identifying the header data Db. The header data alone can thus be read and displayed on the display 29 through the video display memory 7 and display processor 6. This operation is executed for every videotext program stored in the RAM 4, and the extracted header data is accordingly displayed as a table on the display 29.

A second embodiment of the present invention is described below in connection with FIG. 5.

Figure 5:
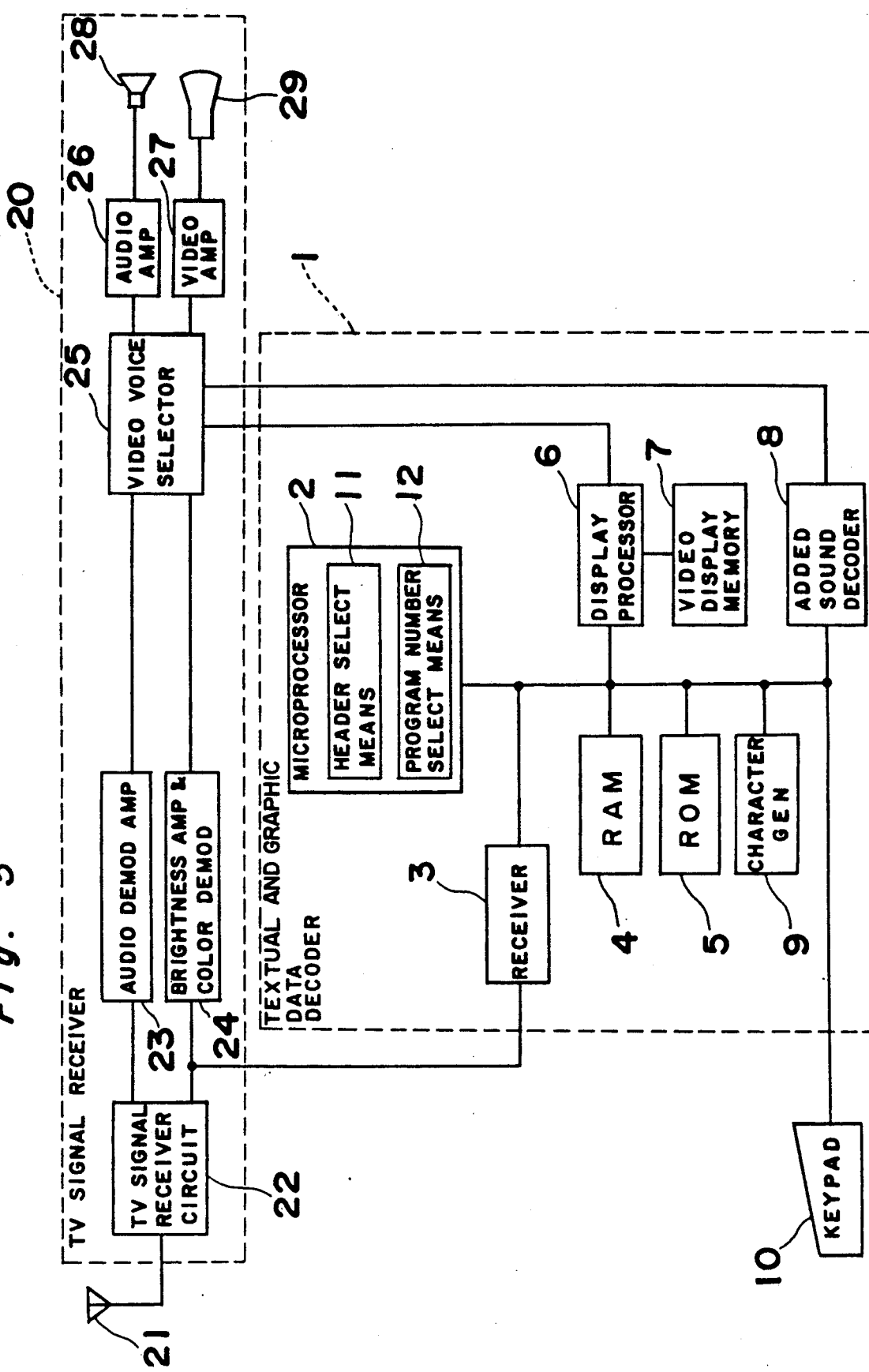
FIG. 5 is a block diagram of the videotext receiver according to a second embodiment of the present invention.

Referring to FIG. 5, the construction of the videotext receiver according to the second embodiment is shown. As shown in FIG. 5, the videotext receiver is comprised of a textual and graphic data decoder 1 which includes receiver circuit 3, RAM 4, ROM 5, display processor 6, video display memory 7, added sound decoder 8 and keypad 10. The videotext receiver is also comprised of a television signal receiver 20 which includes antenna 21, television signal receiver circuit 22, audio demodulation amplifier 23, brightness amplifier and color demodulator circuit 24, video/voice selector 25, audio amplifier output circuit 26, video amplifier output circuit 27, speaker 28, and display 29. Each of these components is the same as that of the corresponding number in FIG. 1 described above.

According to the second embodiment, a microprocessor 2 is provided which is comprised of a header select means 11 and a program number select means 12. The header select means 11 selects and compiles a table of only the header data Db in the textual and graphic data stored in the RAM 4. The program number select means 12 extracts the program number from the control data Da contained in the text and graphic data and displays this program number in place of the header data when there is no header data contained in the textual and graphic data.

The operation of a videotext receiver of the second embodiment is described below.

In principle, the videotext receiver according to the second embodiment operates the same as the preferred embodiment shown in FIG. 1, but it further operates in compliance with the following situation.

In some videotext broadcasts, there are programs in which the textual and graphic data does not contain header data. Such programs may be the programs with superimpositions and single line horizontally scrolling text. Therefore, when text and graphic data containing no header data is stored in the RAM 4, the header select means 11 obtains the program number from the control data Da included in the textual and graphic data, converts this program number to the image data required for the header data table, and stores this data in the video display memory 7. The header data table stored in the video display memory 7 is then displayed on the display 29 as described in the preferred embodiment.

As thus described, according to the second embodiment, RAM 4 which stores the textual and graphic data of the received videotext program, and microprocessor 2 including header select means 11 for extracting the header data Db contained in the textual and graphic data stored in the RAM 4 and program number select means 12 for obtaining the program number from the control data included in the text and graphic data when the text and graphic data contains no header data, are provided. Thus, a table of videotext programs stored in the RAM 4 can still be compiled without requiring a complex user operation even for videotext broadcasts carrying no header data.

Furthermore, in both the first and second embodiments of the present invention, if the header select means 11 is a type which displays the header data according to a specified character, color, or display position contained in the header data, the character display position and/or color can be changed for a unified header data table display which is easier for the user to read and view.

In addition, if the header select means 11 is a type which selects and displays only part of the header data in the textual and graphic data stored in the RAM 4, when multiple textual and graphic data with the same program number but different page numbers is stored in the memory, the header display can display data representative of the header for one page instead of displaying all header data.

As described above, by providing a videotext receiver with a memory device storing the textual and graphic data of the received videotext program, and a microprocessor comprised of a header select means which selects and displays only the header data contained in the text and graphic data stored in the memory, a table listing the videotext programs stored in the memory can be compiled and displayed without requiring the user to execute a complicated procedure.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A video text receiver for receiving textual and graphic data including control data, header data and main text data, comprising:
    a first memory means for storing the textual and graphic data of a plurality of programs in a received broadcast signal;
    a control means having a header select means for selecting the header data in the textual and graphic data stored in said first memory means when said textual and graphic data includes the header data, and selecting the program number from the control data in the textual and graphic data when said textual and graphic data fails to include header data, using the program number in place of the header data; and
    a second memory means for storing a plurality of the selected header data.

2. A videotext receiver as claimed in claim 1, further comprising:
    a display processor for forming an image data of the header data stored in said second memory means; and
    a means for displaying said image data in a form of a list of a plurality of header data.

3. A videotext receiver as claimed in claim 1, wherein said control means further has a program number select means for selecting a program number from said control data included in the textual and graphic data.

4. A videotext receiver as described in claim 1, wherein said header select means selects the header data in accordance with a part of the text, color, and display data specifications.

5. A videotext receiver as described in claim 1, wherein said header select means selects within the header data only a part of the header data.

* * * * *